US011835987B2

(12) United States Patent
Kadam

(10) Patent No.: US 11,835,987 B2
(45) Date of Patent: *Dec. 5, 2023

(54) METHODS AND APPARATUS FOR FINDING LONG METHODS IN CODE

(71) Applicant: DevFactory Innovations FZ-LLC, Dubai (AE)

(72) Inventor: Aditya T. Kadam, Pune (IN)

(73) Assignee: DevFactory Innovations FZ-LLC, Dubai (AE)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,820

(22) Filed: Sep. 1, 2022

(65) Prior Publication Data

US 2023/0020646 A1   Jan. 19, 2023

Related U.S. Application Data

(63) Continuation of application No. 16/886,957, filed on May 29, 2020, now Pat. No. 11,467,829, which is a
(Continued)

(51) Int. Cl.
| | |
|---|---|
| *G06F 8/41* | (2018.01) |
| *G06F 9/44* | (2018.01) |
| *G06F 8/71* | (2018.01) |
| *G06F 11/34* | (2006.01) |
| *G06F 9/455* | (2018.01) |
| *G06F 8/77* | (2018.01) |
| *G06F 8/72* | (2018.01) |
| *G06F 8/75* | (2018.01) |

(52) U.S. Cl.
CPC .............. *G06F 8/77* (2013.01); *G06F 8/443* (2013.01); *G06F 8/72* (2013.01); *G06F 8/75* (2013.01)

(58) Field of Classification Search
CPC ... G06F 8/77; G06F 8/443; G06F 8/72; G06F 8/75; G06F 11/3608; G06F 11/3604; G06F 11/079; G06F 8/71; G06F 8/51; G06F 8/436; G06F 8/4441
See application file for complete search history.

(56) References Cited

U.S. PATENT DOCUMENTS

2021/0405980 A1\*  12/2021  Ghosh ..................... G06F 8/51

OTHER PUBLICATIONS

Liu et al., The detection of code smell on software development: a mapping study, 16 pages (Year: 2017).\*
(Continued)

*Primary Examiner* — Thuy Dao
(74) *Attorney, Agent, or Firm* — Terrile, Cannatti & Chambers, LLP

(57) ABSTRACT

A method and apparatus are disclosed for finding overlong source code segments (e.g., methods) by evaluating input source code segments for a plurality of predetermined code metric values in order to identify candidate source code segments (e.g., non-autogenerated methods) which do not meet a first code metric value and to assess each candidate source code segment against a second code metric value to identify different sets of candidate source code segments (e.g., test methods and normal methods) so that each set of candidate source code segments may be assessed against a tailored set of code length thresholds to identify any overlong source code segment having a code length which meets or exceeds at least two of the tailored set of code length thresholds.

25 Claims, 3 Drawing Sheets

Related U.S. Application Data continuation of application No. 15/701,730, filed on Sep. 12, 2017, now Pat. No. 10,705,837.

(56) References Cited

OTHER PUBLICATIONS

Brdar et al., Semi-supervised detection of Long Method and God Class code smells, 6 pages (Year: 2022).*
Notice of Allowance dated Jun. 2, 2022, filed in U.S. Appl. No. 16/886,957, pp. 1-4.
Response to Ex Parte Quayle Actions dated Apr. 7, 2022, filed in U.S. Appl. No. 16/886,957, pp. 1-7.
Terminal Disclaimer approved Apr. 7, 2022, filed in U.S. Appl. No. 16/886,957, p. 1.
Terminal Disclaimer filed Apr. 7, 2022, filed in U.S. Appl. No. 16/886,957, pp. 1-2.
Ex Parte Quayle Action dated Oct. 7, 2021, filed in U.S. Appl. No. 16/886,957, pp. 1-6.
Examiner Interview Summary dated Oct. 7, 2021, filed in U.S. Appl. No. 16/886,957, p. 1.
Response to Non-Final Office Action dated Jul. 30, 2021, filed in U.S. Appl. No. 16/886,957, pp. 1-9.
Non-Final Office Action dated Apr. 30, 2021, filed in U.S. Appl. No. 16/886,957, pp. 1-8.

* cited by examiner

METHODS AND APPARATUS FOR FINDING LONG METHODS IN CODE

BACKGROUND OF THE INVENTION

Field of the Invention

The present invention is directed in general to field of information processing. In one aspect, the present invention relates generally to a software program development tool, method, and apparatus in a data processing system.

Description of the Related Art

Computer programmers, developers, coders and/or software engineers write, test, debug, and maintain computer software or code instructions, called computer programs, which computers must follow to perform their functions. When writing or making changes to computer program to address new or unique technical challenges, programmers often create new, original and unique programming source code which can, unfortunately, suffer from performance limitations and other sub-optimalities. For example, a programmer's unique source code may include a number of undetected software bugs or vulnerabilities or otherwise suffer from low quality or robustness. These problems can be exacerbated as he code is updated or new features are added, with the resulting increases in code length and complexity creating additional opportunities for potential problems, like possible bugs, unused code, complicated code, redundant code, code smells, bad practices, and so on. These problems can be addressed with development tools which analyze the code to improve and reduce defects by inspecting the source code (e.g., C, C++ and Objective-C) to identify potential problems and apply code refactoring techniques to address the identified problems by improving nonfunctional attributes of the software (e.g., code readability and simplicity) through restructuring of the code's internal structure without changing its external behavior. For example, in class-based programming or object-oriented programming environments, a programming "method" often starts out as being well-written, but as additional code lines and complexity are added to include more and more functionality, the method becomes harder to maintain, understand, debug or reuse. While there are refactoring tools available for detecting long methods in source code (e.g., PMD, JDeodorant, FindBugs, Understand, and Source Making), such tools typically define a single line count threshold value that is compared against the total number of lines in the method or the total code lines (i.e., no non-blank lines) when assessing whether a method exceeds the code length threshold. As a result, the large number of methods being flagged as overlong make the identified results non-actionable and/or include numerous false positives in this approach. And while the use of source code analyzer tools is considered a best practice for software development, the existing solutions are extremely difficult at a practical level by virtue of the difficulty in accurately and efficiently identifying overlong methods.

SUMMARY OF THE INVENTION

A system, apparatus, and methodology are described for efficiently identifying code smells in a method, class, code, or entity (a.k.a., code segment) to improve source code performance, reuse and/or maintainability by automating the actionable identification and prioritization of overlong code segments for refactoring treatment. Rather than evaluating the total number of non-blank code lines in each code segment against a single threshold value, selected embodiments of the present disclosure apply a plurality of filters and tailored code length thresholds to each code segment in the submitted source code to eliminate certain code segments as long segment candidates, to reduce their effective code length, and/or to evaluate the computed effective code length against the tailored code length thresholds which may be individually configurable by the programmer. Selected embodiments of the disclosed system, apparatus, and methodology use machine learning, natural language processing (NLP), and/or artificial intelligence (AI) in combination with static and/or dynamic code analysis techniques to automatically analyze code segments for excessive length and yield prioritized code refactoring opportunities. As a preliminary step, each input code segment is automatically assessed for predetermined code metrics for use in determining whether the code segment is overlong. For example, each input code segment may be assessed by applying one or more code analysis tools to determine if the code segment is autogenerated, to determine if the code segment is a test method or normal method, to determine if the code segment includes anonymous or local classes, to determine the maximum nesting level of the code segment, to determine the number of linearly independent paths through the code segment in terms of the number of conditional branches included therein (e.g., cyclomatic complexity or modified cyclomatic complexity), and/or to determine a statement count for the code segment. Based on the predetermined code metrics assessed for each code segment, the autogenerated code segment and/or any portion of code segment that is an anonymous or local class may be removed or filtered from consideration as an overlong code segment. In addition, any code segments which are identified as test methods may be assessed against a first tailored set of code length thresholds which are larger than a second tailored code length thresholds used to assess code segments identified as normal methods since test methods are less likely to have code-length related errors. For example, each of the tailored sets of code length thresholds may include a lower limit and an upper, hard limit so that a code segment having an effective code length that is smaller than the lower limit will not be flagged as overlong, while a code segment having an effective code length that is meets or exceeds the upper hard limit will be flagged as overlong. As for code segments having effective code lengths between the lower and upper limits, the code segment may be identified as overlong only if specified thresholds for the maximum nesting, conditional branch, and statement count are exceeded. As a result of assessing the input code segments in the submitted source code, the programmer may be presented with one or more flagged code segments which are prioritized as long methods for possible refactoring.

The objects, advantages and other novel features of the present invention will be apparent from the following detailed description when read in conjunction with the appended claims and attached drawings.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A long code segment detection engine, methodology, and apparatus are described for efficiently and accurately identifying overlong code segments in a method, class, code, or entity by filtering code lines and/or code segments based on predetermined code metrics that are assessed against tailored sets of code length threshold limits to identify and recommend code segments for refactoring treatment by developers. In disclosing the claimed method and system for identifying overlong code segments by using specific rules, rather than humans, to classify code segments by assembling a plurality of code length threshold limits, computing predetermined code metrics for each code segment, and evaluating the predetermined code metrics against the code length threshold limits, there is disclosed an improvement in computer-related technology that uses a combined order of specific rules that renders information into a specific format that is then used and applied to create desired results in the form of identified overlong code segments While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
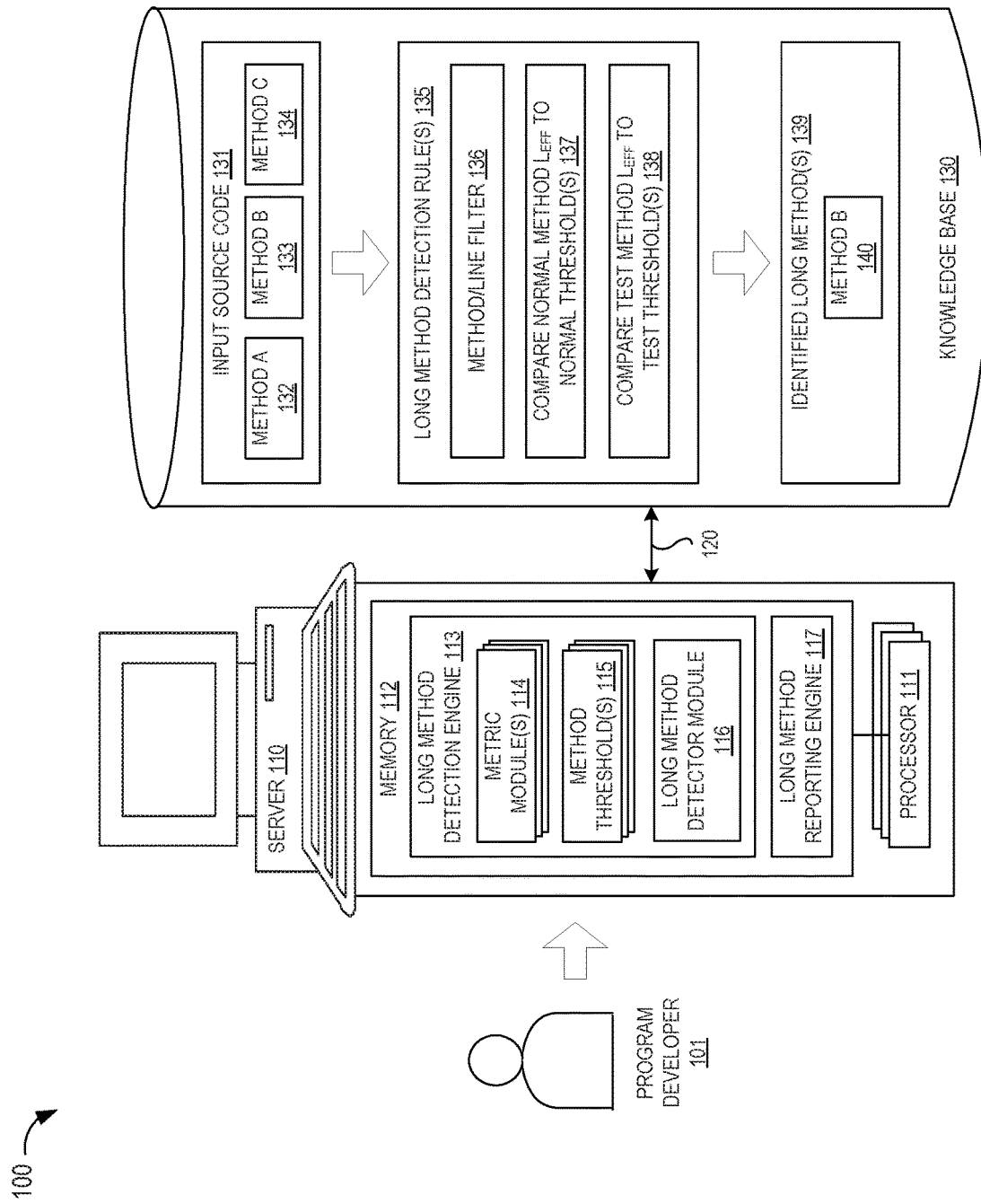
FIG. 1 is a simplified block diagram of a data processing system for detecting and reporting long methods in accordance with selected embodiments of the present disclosure.

Referring now to FIG. 1, a simplified block diagram illustrates an exemplary data processing system 100 for generating automatically identifying and prioritizing overlong code segments (e.g., long methods) with one or more server/computer systems 110 and associated database storage devices 130 which may be connected together over a suitable connection link 120 or network, such as a private wide area network (WAN) or the Internet (not shown), to evaluate input source code 131 that is input by a program developer 101. In some illustrative embodiments, the server/computer system 110 may be embodied as a Question Answering (QA) system to use NLP, machine learning, and/or artificial intelligence processing techniques which are augmented with the mechanisms of the illustrative embodiments described hereafter. In a QA system implementation, a long method detection engine 113 and/or long method reporting engine 117 may be embodied as a computer program stored in memory 112 which uses one or more processors 111 to query a structured or unstructured knowledge or information in the knowledge database 130 which includes input source code files 131, one or more long method detection rules 135-138, and the resulting identified long methods 139. Thus stored in memory 112, the long method detection and reporting engines 113, 117 may be configured to assess input source code files (e.g., Methods A-C 132-134) against the long method detection rules 136-138 for purposes of prioritizing and reporting an identified long method (e.g., Method B 140) as a candidate for refactoring treatment. The configuring of the long method detection and reporting engines 113, 117 may include providing application specific hardware, firmware, and/or software to implement one or more control logic modules 114-117 to facilitate the performance of the operations and generation of the outputs described herein with regard to the illustrative embodiments. In addition or in the alternative, the configuring of the long method detection and reporting engines 113, 117 may include storing software applications in one or more storage devices and loaded into memory of a computing device, such as server 110, for causing one or more hardware processors (e.g., 111) of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

As will be appreciated, once the server/computer system 110 is configured to implement the long method detection and/or reporting engines 113, 117, the server/computer system 110 becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates identification and prioritization of long code segments for refactoring recommendations to a program developer 101 by applying the method/line filter 136 to each of the input source code files 132-134 to identify normal methods and test methods whose effective code length measures are separately evaluated against tailored code limit thresholds 115 at modules 137, 138 using a plurality of code metric measures extracted from each input source code file by one or more metric modules 114, thereby recommending an identified overlong source code file 140 for presentation to the program developer for refactoring treatment.

As a preliminary step in identifying overlong code segments 140 from the code segments 132-134 in an input source code file 131, the long method detection engine 113 may include one or metric modules 114 which apply NLP or machine learning techniques to assess each code segment (e.g., Method A 132) for predetermined code metrics for use in determining whether the code segment is overlong. For example, a first metric module 114 may assess the input code segment to determine if the code segment is autogenerated or not, such as by automatically searching the code segment comment(s) for an "autogenerated" reference or the like. In addition, a second metric module 114 may also be configured to use an NLP or machine learning process to determine if the code segment is a test method or normal method, such as by automatically searching the code segment name or annotations for a "test" reference or the like, thereby classifying the code segment as a "test" segment (which is less likely to have functional errors) or a "normal" segment (which is more likely to have functional errors). In addition, a third metric module 114 may be configured to identify any anonymous or local classes on the code segment and to determine the total length of such classes in the code segment, such as by automatically invoking a code analysis tool, such as Understand, to analyze the code segment to identify anonymous/local class lines which will be excluded from the effective code length computation for the code segment. In addition, the metric module 114 may be configured to determine other code metrics, such as the maximum nesting level, modified cyclomatic complexity, or statement count of the code segment, such as by using Understand or similar integrated development environment tools.

Once the predetermined code metrics measures are extracted from an input code segment, the long method detection engine 113 may be further configured to identify or retrieve a plurality of code length limit threshold values 115 from memory 112 and/or from the knowledge base 130. For example, the code length limit threshold values 115 may include a first tailored set of code length thresholds for application against identified test methods, such as a lower test limit (e.g., Test_Method_Length_Lower_Limit or "TMLLL"), upper test limit (e.g., Test_Method_Length_Hard_Limit or "TMLHL"), and/or statement count limit (e.g., Test_Method_Statement_Threshold or "TMST"). In addition, the code length limit threshold values 115 may include a second tailored set of code length thresholds for application against identified regular or normal methods, such as a lower normal threshold value (e.g., Method_Length_Lower_Limit or "MLLL"), upper normal threshold value, (e.g., Method_Length_Hard_Limit or "MLHL"), and/or normal statement count limit (e.g., Method_Statement_Count_Threshold or "MSCT"). The code length limit threshold values 115 may also include additional code length threshold limits, such as an upper limit cyclomatic complexity (e.g., Cyclomatic_Complexity_Threshold or "CCT") and/or upper limit for maximum nexting (e.g., Max_Nesting_Limit or "MNL"). As will be appreciated, the values of the code length limit threshold values 115 are configurable by the program developer 101 to provide differentiated treatment to different types or classes of code segments With the code metrics and thresholds retrieved, the long method detection engine 113 may be further configured to include a long method detector module 116 which applies the long method detection rules 135 as a heuristic engine to identify the overlong code segments (e.g., Method B 140) from the input source code segments 131. To this end, the long method detector module 116 may apply a filter detection rule 136 to filter the autogenerated code segment(s) and/or any portion(s) of code segment(s) that are anonymous or local classes from consideration as an overlong code segment. For example, the filter detection rule 136 may be applied to determine that an autogenerated method is not, by definition, an overlong method. In addition or the in alternative, the filter detection rule 136 may be applied to measure the effective code line length of a method by removing the number of lines for any anonymous or local class from the computed code line length for a method. In addition, the long method detector module 116 may apply a first comparison detection rule 137 to detect overlong normal methods by comparing the effective code line length $L_{EFF}$ for a normal method to lower and upper normal threshold values (e.g., MLLL and MLHL) so that any normal method is identified as overlong if either (1) its effective code line length $L_{EFF}$ exceeds the upper normal threshold value MLHL, or (2) its effective code line length $L_{EFF}$ exceeds the lower normal threshold value MLLL and a plurality of additional code length metric measures (e.g., normal statement count, modified cyclomatic complexity, maximum nesting) exceed corresponding threshold limits (e.g., MSCT, CCT, and MNL). The long method detector module 116 may also apply a second comparison detection rule 138 to detect overlong test methods by comparing the effective code line length $L_{EFF}$ for a test method to lower and upper normal threshold values (e.g., TMLLL and TMLHL) so that any test method is identified as overlong if either (1) its effective code line length $L_{EFF}$ exceeds the upper test threshold value TMLHL, or (2) its effective code line length $L_{EFF}$ exceeds the lower test threshold value TMLLL and a plurality of additional code length metric measures (e.g., normal statement count, modified cyclomatic complexity, maximum nesting) exceed corresponding threshold limits (e.g., TMST, CCT, and MNL).

As will be appreciated, the performance and accuracy of the long method detector module 116 and applied long method detection rules 135 will depend on the values of the different code length threshold limits. For example, the code length threshold limits used to assess normal methods may be set to smaller values than the code length threshold limits for test methods since test methods are less likely to have code-length related errors. For similar reasons, the statement count threshold limits for normal methods should generally be smaller than the statement count threshold limits for test methods. Though it will be appreciated that the configurable threshold limits may be adjusted to meet the individual requirements of any input source code being evaluated, it has been discovered through testing and analysis that the following threshold limits provide good performance in efficiently identifying overlong methods:

_METHOD_LENGTH_LOWER_LIMIT=75
_METHOD_STATEMENT_COUNT_THRESHOLD=55
_METHOD_LENGTH_HARD_LIMIT=150
_CYCLOMATIC_COMPLEXITY_THRESHOLD=2
_MAX_NESTING_LIMIT=2
_TEST_METHOD_LENGTH_LOWER_LIMIT=90
_TEST_METHOD_STATEMENT_THRESHOLD=70
_TEST_METHOD_LENGTH_HARD_LIMIT=150

Once the overlong code segments are identified or flagged, the server/computer system 110 may be configured to include a long method reporting engine 117 which generates a prioritized listing of the overlong code segments for review by the program developer 101. In prioritizing the identified long methods, the long method reporting engine 117 may be configured to calculate a "PRIORITY" value to determine which detected long method should be fixed first. In selected embodiments, the "PRIORITY" value may be calculated as the product of the number of statement lines in the method (e.g., NUMBER_OF_STATEMENT_LINES_IN_METHOD) and one or more scaling factors, depending on whether the method is a test method. For example, a first "PRIORITY" value for each long method may be calculated by applying a first maximum nexting scaling factor (e.g., (1.0+MAXIMUM_NESTING_IN_METHOD)/4.0)), to the number of method statement lines. In addition, a second or updated "PRIORITY" value may be calculated for each long method that is a test method by applying a second scaling factor (e.g., ⅓) to the previously calculated first "PRIORITY" value. In this way, the "PRIORITY" values for each identified long method that have the higher values will be identified as having the more severe length violations. While these scaling factors provide suitable examples for implementations of the long method reporting engine 117, it will be appreciated that other scaling factors may be used based on analysis of length violations in open source projects or other proprietary code bases. However generated, the "PRIORITY" values output may be stored along with other information relating to the identified long methods, and the reporting engine 117 may also issue a report that provides the results of the long method detection analysis to the user in the form of a ranked list of overlong code segments, each identified by the code segment name, alone or in combination with information specifying the code segment's length, statement count, cyclomatic complexity, maximum nesting value, location of the code segment (e.g., starting and ending lines), and/or the name of the developer for the code segment. In selected embodiments, long method reporting engine 117 is operative to generate one or more reports based on the analysis results received from long method detection engine 113. While the presentation of each report can be arranged in any suitable fashion to efficiently convey a prioritized ranking of overlong code segments along with related code length metric information, alone or in combination with analysis recommendations to reduce the code length of any identified code segments.

Figure 2:
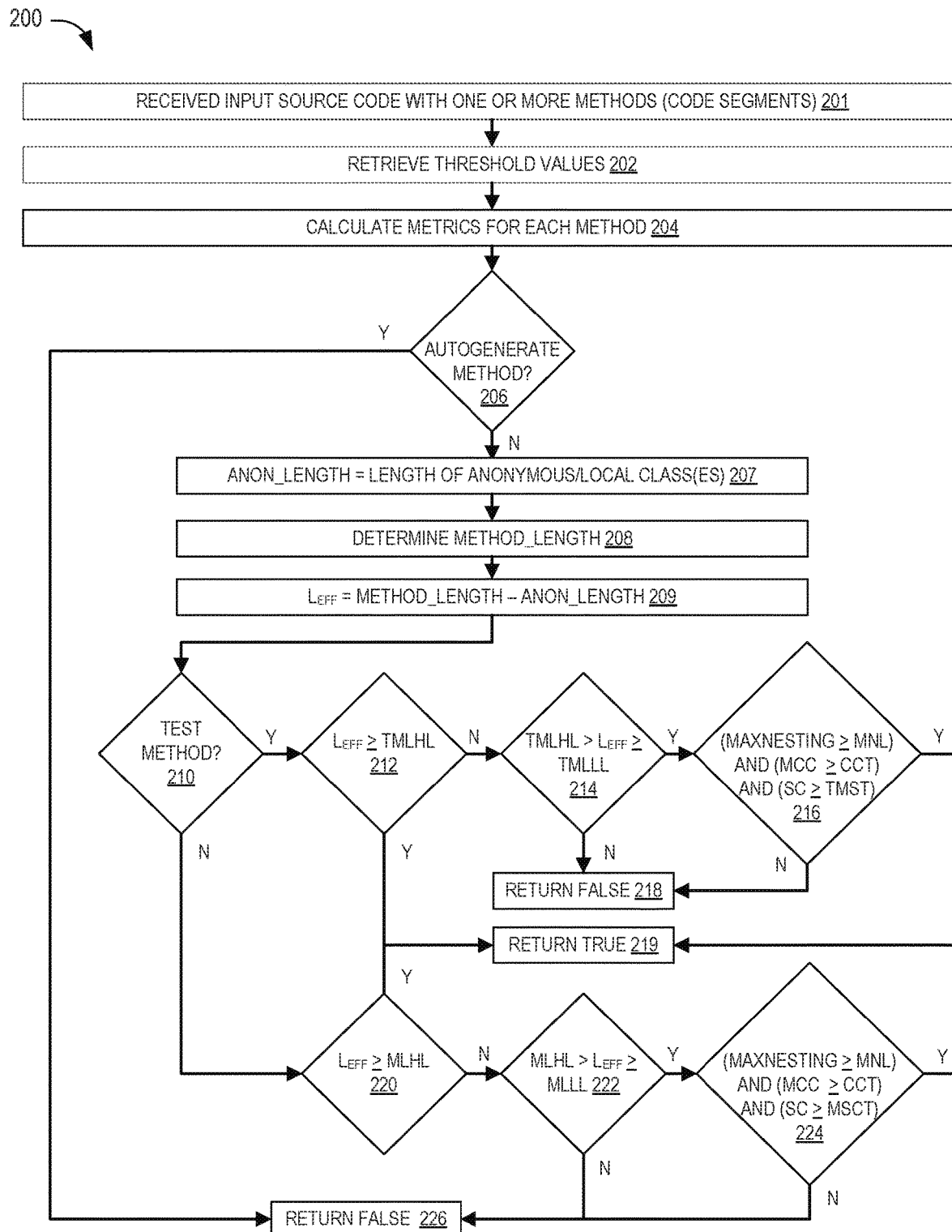
FIG. 2 illustrates a simplified flow chart showing the logic for detecting overlong methods in accordance selected embodiments of the present disclosure.

To provide a contextual understanding for selected embodiments of the present disclosure, reference is now made to FIG. 2 which illustrates a simplified detection workflow 200 showing the logic for detecting overlong methods from input source code using the following pseudocode:

```
Calculate all the metrics for each method that are defined above
Get the values of the thresholds described above
If method is autogenerated :
    Return False
Set anonymous_length = length of anonymous/local classes in the method
    effective_length = method_length – anonymous_length
If method is a test method:
    If effective_length >= TEST_METHOD_LENGTH_HARD_LIMIT:
        Return True
    If effective_length >= TEST_METHOD_LENGTH_LOWER_LIMIT and
    effective_length < TEST_METHOD_LENGTH_HARD_LIMIT :
        If maximum nesting of method >= MAX_NESTING_LIMIT and
        modified cyclomatic complexity of method >=
        CYCLOMATIC_COMPLEXITY_THRESHOLD and total statement
        lines in the method >=
        TEST_METHOD_STATEMENT_THRESHOLD
            Return True
Else:
    If effective_length >= METHOD_LENGTH_HARD_LIMIT:
        - Return True
    If effective_length >= METHOD_LENGTH_LOWER_LIMIT and
    effective_length < METHOD_LENGTH_HARD_LIMIT :
        If maximum nesting of method >= MAX_NESTING_LIMIT and
        modified cyclomatic complexity of method >=
        CYCLOMATIC_COMPLEXITY_THRESHOLD and total statement
        lines in the method >=
        METHOD_STATEMENT_COUNT_THRESHOLD
            Return True
Return False
```

As will be appreciated, the depicted detection workflow 200 may be implemented in whole or in part with a data processing system (such as shown in FIG. 1) and/or a single integrated circuit (e.g., a system-on-chip) or a plurality of integrated circuits to implement one or more processors with local memory and database storage that are interconnected and interoperate using any suitable techniques without departing from the present invention.

However implemented, the detection workflow 200 receives input source code (block 201) having one or more code segments (e.g., methods) which may be checked into the system as source code and binary files created by the program developer. An additional input to the detection work flow 200 is the threshold limit values that may be retrieved from the knowledge base or memory (block 202). In selected embodiments, the retrieved threshold values are configurably specified as limits for evaluating normal methods, including a defined Method_Length_Lower_Limit (MLLL), Method_Length_Hard_Limit, and Method_Statement_Count_Threshold (MSCT). In addition, the retrieved threshold values may also configurably specify limits for evaluating test methods with a Test_Method_Length_Lower_Limit (TMLLL), Test_Method_Length_Hard_Limit (TMLHL), and Test_Method_Statement_Threshold (TMST). Finally, the retrieved threshold values may also configurably specify limits for evaluating any test or normal methods in terms of a Cyclomatic_Complexity_Threshold (CCT) and Max_Nesting_Limit (MNL).

Upon check-in to the detection workflow 200, the input source code is automatically assessed (at block 204) by applying one or more code analysis tools to each method contained therein to determine if the method meets predetermined code metrics. While any suitable code assessment techniques may be used, selected embodiments may employ NLP processing to determine if the method is autogenerated, to determine if the method is a test method or normal method, to determine if the method includes anonymous or local classes, to determine the maximum nesting level of the method, to evaluate the modified cyclometric complexity of the method, and/or to determine a statement count for the method. For example, predetermined code metrics at step 204 may be calculated with one or more metric modules 114 from the long method detection engine 113 shown in FIG. 1, and then passed to the long method detector module engine 117 which in turn applies one or more of the long method detection rules 135.

In a first example detection rule, the input source code may be pruned or filtered (at block 206) by using one or more of the predetermined code metrics to identify and remove any autogenerated methods from consideration as candidate long methods. While any suitable filtering approach may be used, selected embodiments may employ NLP processing techniques to break an input method or code segment into tokens (e.g., tokenized source code) which are passed to the long method detection module 116 which applies the method filter detection rule 136 to detect any autogenerated methods, such as by automatically searching the tokenized source code comment(s) for an "autogenerated" reference or the like. If an autogenerated method is detected (affirmative outcome to detection step 206), the method is filtered out from the pool of candidate long methods (e.g., Return False 226). However, for methods that are not autogenerated (negative outcome to detection step 206), the detection workflow 200 proceeds to the next processing steps for computing an effective code line length measure $L_{EFF}$ for each method.

In order to compute the effective code line length measure $L_{EFF}$ for a method (at block 209), a second detection rule may be applied which uses one or more of the predetermined code metrics to determine if the code segment includes anonymous or local classes, in which case the number of code lines corresponding to the anonymous or local class(es) are removed from the total method length. As will be appreciated, any suitable computational approach may be used to determine the effective code line length measure $L_{EFF}$, such as by employing any desired code analysis tool to determine a code length measure (Anon_Length) of the number of code lines in any detected anonymous or local classes in the method (block 207). In similar fashion, suitable code analysis tools can be used to determine the total code length measure (Method_Length) of the method (block 208), and then determine the difference therebetween as the effective code line length measure $L_{EFF}$=Method_Length−Anon_Length (block 209).

Once the effective code line length measure $L_{EFF}$ for a method is determined at step 209, the detection workflow 200 then proceeds to determine whether the method is a test method or normal method (block 210), such as by applying a third detection rule which uses one or more of the predetermined code metrics to detect "test" references. To this end, selected embodiments may employ NLP processing techniques to identify "test" methods (affirmative outcome to detection step 210) or "normal" methods (negative outcome to detection step 210), such as by automatically searching the method name or the tokenized source code annotations for a "test" reference or the like.

For each test method (affirmative outcome to detection step 210), the method is compared to an upper hard limit (block 212), such as by comparing the computed effective code line length measure $L_{EFF}$ to an upper hard limit (e.g., TMLHL). If the test method length meets or exceeds the upper hard limit (affirmative outcome to detection step 212), the method is flagged as a candidate long method (e.g., Return True 219), but if not (negative outcome to detection step 212), the method length is compared to an lower limit (block 214), such as by comparing the computed effective code line length measure $L_{EFF}$ to an lower limit (e.g., TMLLL). If the method length does not meet or exceed the lower test limit (e.g., $L_{EFF}$<TMLLL) (negative outcome to detection step 214), the method is filtered out from the pool of candidate long methods (e.g., Return False 218). However, if the method length meets or exceeds the lower test limit and is smaller than the upper hard limit (affirmative outcome to detection step 214), the detection workflow 200 proceeds to the complexity condition check step 216 which checks one or more method complexity code metrics against specified threshold limits. For example, the processing at step 216 may employ NLP or machine learning techniques to check the test method's maximum nesting metric (e.g., MAXNEXTING) against a maximum nesting threshold limit (e.g., MNL), to check the test method's modified cyclomatic complexity metric (e.g., CCM) against a maximum cyclomatic complexity threshold limit (e.g., CCT), and to check the test method's statement count/line metric (e.g., SC) against a test method statement threshold limit (e.g., TMST). If the test method complexity code metrics all meet or exceed the corresponding complexity threshold limits (affirmative outcome to detection step 216), the method is flagged as a candidate long method (e.g., Return True 219), but if not (negative outcome to detection step 216), the method is filtered out from the pool of candidate long methods (e.g., Return False 218). Upon return of any "false" or "true" flag for a method, the next method is processed in sequence by returning to step 204.

A similar set of processing steps is applied to each detected normal method (negative outcome to detection step 210), albeit with different threshold limit values that may be individually configured. For example, each detected normal method is compared to an upper hard limit (block 220), such as by comparing the computed effective code line length measure $L_{EFF}$ to an upper hard limit (e.g., MLHL) which may be smaller than the upper hard limit (e.g., TMLHL). If the method length meets or exceeds the upper hard limit (affirmative outcome to detection step 220), the method is flagged as a candidate long method (e.g., Return True 219), but if not (negative outcome to detection step 220), the method length is compared to an lower limit (block 222), such as by comparing the computed effective code line length measure $L_{EFF}$ to an lower limit (e.g., MLLL) which may be smaller than the lower test limit (TMLLL). If the method length does not meet or exceed the lower limit (e.g., $L_{EFF}$<MLLL) (negative outcome to detection step 222), the method is filtered out from the pool of candidate long methods (e.g., Return False 226). However, if the method length meets or exceeds the lower limit and is smaller than the upper hard limit (affirmative outcome to detection step 222), the detection workflow 200 proceeds to the complexity condition check step 224 which checks one or more method complexity code metrics against specified threshold limits.

For example, the processing at step 224 may employ NLP or machine learning techniques to check the method's maximum nesting metric (e.g., MAXNEXTING) against a maximum nesting threshold limit (e.g., MNL), to check the method's modified cyclomatic complexity metric (e.g., CCM) against a maximum cyclomatic complexity threshold limit (e.g., CCT), and to check the method's statement count/line metric (e.g., SC) against a method statement count threshold limit (e.g., MSCT). If the "normal" method complexity code metrics all meet or exceed the corresponding complexity threshold limits (affirmative outcome to detection step 224), the method is flagged as a candidate long method (e.g., Return True 219), but if not (negative outcome to detection step 224), the method is filtered out from the pool of candidate long methods (e.g., Return False 226). Upon return of any "false" or "true" flag for a method, the next method is processed in sequence by returning to step 204.

As described hereinabove, any long methods identified at step 219 may be further processed to prioritize the severity of the length violation. In an example implementation, each candidate long method may be prioritized by calculating a "PRIORITY" value to determine which detected long method should be fixed first. For example, a first "PRIORITY" value may be calculated as the product of the number of statement lines in the method and a first maximum nexting scaling factor, as set forth below:

PRIORITY=NUMBER_OF_STATEMENT_LINES_IN_METHOD*
((1.0+MAXIMUM_NESTING_IN_METHOD)/
4.0).

In addition, a second or updated "PRIORITY" value may be calculated for each long method that is a test method by applying a second scaling factor to the previously calculated first "PRIORITY" value, as set forth below:

PRIORITY=PRIORITY/3.0).

In this way, the "PRIORITY" values for each identified long method that have the higher values will be identified as having the more severe length violations. While these scaling factors provide suitable examples for implementations of the prioritization of long method reporting, it will be appreciated that other scaling factors may be used based on analysis of length violations in open source projects or other proprietary code bases.

Figure 3:
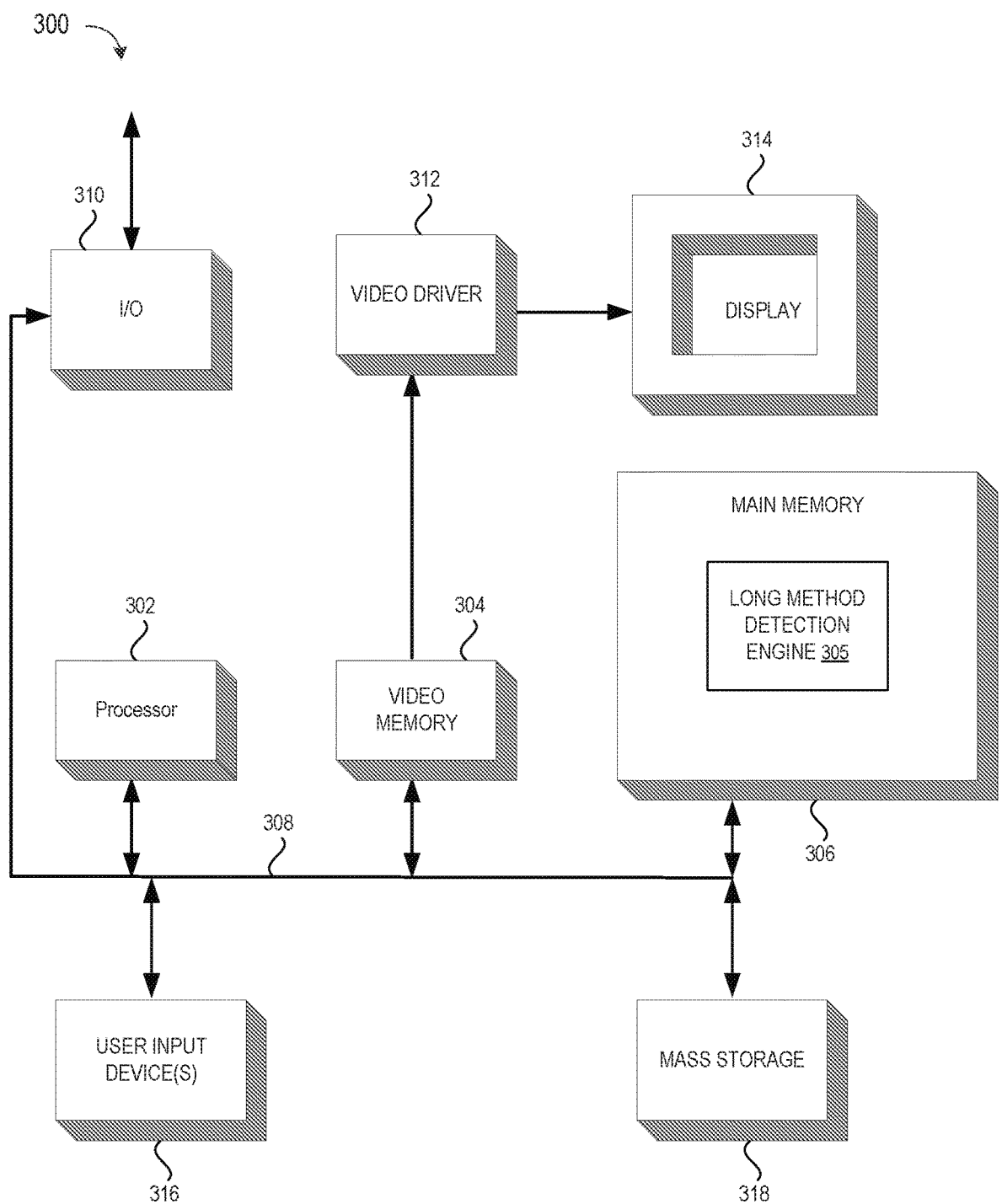
FIG. 3 is a simplified block diagram of a general-purpose computer in accordance with selected embodiments of the present disclosure.

Embodiments of the system and method for identifying overlong code segments can be implemented on a computer system, such as a general-purpose computer 300 illustrated in FIG. 3. As disclosed the computer 300 includes input user device(s) 316, such as a keyboard and/or mouse, which are coupled to a bi-directional system bus 308. The input user device(s) 316 are used for introducing user input to the computer system 300 and communicating that user input to processor 302. The computer system 300 may also include a video memory 304, main memory 306, and mass storage 318, all coupled to bi-directional system bus 308 along with input user device(s) 316 and processor 302. The mass storage 318 may include both fixed and removable media, such as other available mass storage technology. Bus 308 may contain, for example, 32 address lines for addressing video memory 304 or main memory 306. The system bus 308 may also include, for example, an n-bit data bus for transferring data between and among the components, such as CPU 302, main memory 306, video memory 314, and mass storage 318, where "n" is, for example, 32 or 64. Alternatively, multiplex data/address lines may be used instead of separate data and address lines.

The computer 300 may also include I/O device(s) 310 which provide connections to peripheral devices, such as a printer, and may also provide a direct connection to remote server computer systems via a telephone link or to the Internet via an ISP. I/O device(s) 310 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of IO devices include modems, sound and video devices, and specialized communication devices such as the aforementioned network interface.

Computer programs and data are generally stored as instructions and data in mass storage 318 until loaded into main memory 306 for execution. Computer programs may also be in the form of electronic signals modulated in accordance with the computer program and data communication technology when transferred via a network. The method and functions relating to system and method for applying a one or more filters and tailored code length thresholds to each code segment in the submitted source code to eliminate certain code segments as long segment candidates, to reduce their effective code length, and/or to evaluate the computed effective code length against the tailored code length thresholds may be implemented in a computer program for a long method detection engine 305.

The processor 302, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 306 is comprised of dynamic random access memory (DRAM). Video memory 304 is a dual-ported video random access memory. One port of the video memory 304 is coupled to video amplifier or driver 312. The video amplifier 312 is used to drive the display 314. Video amplifier 312 is well known in the art and may be implemented by any suitable means. This circuitry converts pixel data stored in video memory 304 to a raster signal suitable for use by display 314. Display 314 is a type of monitor suitable for displaying graphic images.

By now, it will be appreciated that there is disclosed herein a system, method, apparatus, and computer program product for enhancing operable functionality of a software program by performing a method at a device having a processor and memory for finding long methods in source code. As disclosed, the system, method, apparatus, and computer program receive a plurality of input source code segments from the software program submitted by a developer. Subsequently, the device evaluates each of the plurality of input source code segments for a plurality of predetermined code metric values. In selected embodiments, the each input source code segments is evaluated for a first code metric value (which indicates whether said input source code segment is autogenerated), a second code metric value (which indicates whether said input source code segment is a test code segment), a third code metric value (indicating a cyclomatic complexity of the input source code segment), a fourth code metric value (indicating a maximum nesting value of said input source code segment), and a fifth code metric value (indicating a statement count value for said input source code segment). Using the first code metric value, the device identifies one or more candidate source code segments from the plurality of input source code segments by removing any code segment (e.g., an autogenerated code segment) that meets the first code metric value. Once identified, each candidate source code segment is assessed against the second code metric value to identify a first set of candidate source code segments (e.g., test methods) that contain the second code metric value and a second set of candidate code segments (e.g., normal methods) that do not contain the second predetermined code metric value. The first set of candidate source code segments is assessed against a first tailored set of code length thresholds (e.g., TMLHL, TMLLL, MNL, CCT, TMST) to identify any overlong source code segment in the first set of candidate source code segments having a code length which meets or exceeds at least two of the first tailored set of code length thresholds, where the code length for each candidate source code segment may be computed as an effective code length by subtracting any code lines for anonymous or local classes in the candidate source code segment from the total code lines for the candidate source code segment. For example, the assessment of the first set of candidate source code segments may be performed by comparing the code length for each test method in the first set of test methods against a first lower code length threshold and first upper code length threshold to identify a first overlong test method having a code length (1) which meets or exceeds the first lower code length threshold and the first upper code length threshold or (2) which meets or exceeds the first lower code length threshold and which also has at least one of the third code metric value exceeding a cyclomatic complexity threshold, the fourth code metric value exceeding a maximum nesting threshold, and for the fifth code metric value exceeding a statement count threshold. In similar fashion, the second set of candidate source code segments may be assessed against a second tailored set of code length thresholds (e.g., MLHL, MLLL, MNL, CCT, MSCT) which is different from the first tailored set of code length thresholds to identify any overlong source code segment in the second set of candidate source code segments having a code length which meets or exceeds at least two of the second tailored set of code length thresholds. In selected embodiments, the second set of candidate source code segments may be assessed by comparing the code length for each normal method in the second set of normal methods against a second lower code length threshold and second upper code length threshold to identify a second overlong normal method having a code length (1) which meets or exceeds the second lower code length threshold and the second upper code length threshold or (2) which meets or exceeds the second lower code length threshold and which also has at least one of the third code metric value exceeding a cyclomatic complexity threshold, the fourth code metric value exceeding a maximum nesting threshold, and for the fifth code metric value exceeding a statement count threshold. Based on the foregoing, the device may report a prioritized list of any overlong source code segments that meets or exceeds at least two of the first tailored set of code length thresholds or at least two of the second tailored set of code length thresholds for recommended refactoring treatment by the developer. In selected embodiments, the each identified overlong source code segment may be prioritized by calculating a corresponding priority value as a product of at least a first scaling factor and a first quantity identifying how many statement lines are in the overlong source code segment code.

The present invention may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to automatically identify and prioritize overlong code segments for refactoring opportunities, improve the quality and robustness of software, and generate more readable, reliable, smaller, and robust code with less effort. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the design, functionality and performance of software programs by automatically detecting and recommending overlong code segments for refactoring opportunities in the software program.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for finding overlong code segments may be implemented in any type of computer system or programming or processing environment. It is contemplated that the system and method for identifying and prioritizing overlong code segments might be run on a stand-alone computer system, such as the one described above. The system and method for identifying and prioritizing overlong code segments might also be run from a server computer systems system that can be accessed by a plurality of client computer systems interconnected over an intranet network. Finally, the system and method for identifying and prioritizing overlong code segments projects may be run from a server computer system that is accessible to clients over the Internet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises." "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed by a device having a processor and memory for enhancing operable functionality of a software program, comprising:
   receiving, by the device, a plurality of input source code segments from the software program submitted by a developer:
   evaluating, by the device, each of the plurality of input source code segments for a plurality of predetermined code metric values;
   identifying, by the device, one or more candidate source code segments from the plurality of input source code segments by removing one or more code segments that meet a first code metric value;
   assessing, by the device, each of the one or more candidate source code segments against a second code metric value to identify a first set of candidate source code segments that contain the second code metric value and a second set of candidate code segments that do not contain the second predetermined code metric value;
   assessing the first set of candidate source code segments against a first tailored set of code length thresholds to identify any overlong source code segment in the first set of candidate source code segments having a code length which meets or exceeds at least two of the first tailored set of code length thresholds; and
   assessing the second set of candidate source code segments against a second tailored set of code length thresholds which is different from the first tailored set of code length thresholds to identify any overlong source code segment in the second set of candidate source code segments having a code length which meets or exceeds at least two of the second tailored set of code length thresholds.

2. The method of claim 1, further comprising reporting, by the device, a prioritized list of any overlong source code segments that meets or exceeds at least two of the first tailored set of code length thresholds or at least two of the second tailored set of code length thresholds for recommended refactoring treatment by the developer.

3. The method of claim 1, where evaluating each of the plurality of input source code segments for the plurality of predetermined code metric values comprises evaluating each input source code segment for the first code metric value which indicates whether said input source code segment is autogenerated, for the second code metric value which indicates whether said input source code segment is a test code segment, for a third code metric value indicating a cyclomatic complexity of the input source code segment, for a fourth code metric value indicating a maximum nesting value of said input source code segment and for a fifth code metric value indicating a statement count value for said input source code segment.

4. The method of claim 3, where identifying one or more candidate source code segments comprises removing any autogenerated input source code segment that meets the first code metric value.

5. The method of claim 3, where assessing each of the one or more candidate source code segments comprises identifying a first set of test methods that contain the second code metric value and a second set normal methods that do not contain the second predetermined code metric value.

6. The method of claim 5, where assessing the first set of candidate source code segments comprises comparing a code length for each test method in the first set of test methods against a first lower code length threshold and first upper code length threshold to identify a first overlong test method having a code length (J) which meets or exceeds the first lower code length threshold and the first upper code length threshold or (2) which meets or exceeds the first lower code length threshold and which also has at least one of the third code metric value exceeding a cyclomatic complexity threshold, the fourth code metric value exceeding a maximum nesting threshold, and for the fifth code metric value exceeding a statement count threshold.

7. The method of claim 6, where assessing the second set of candidate source code segments comprises comparing a code length for each normal method in the second set of normal methods against a second lower code length threshold and second upper code length threshold to identify a second overlong normal method having a code length (1) which meets or exceeds the second lower code length threshold and the second upper code length threshold or (2) which meets or exceeds the second lower code length threshold and which also has at least one of the third code metric value exceeding a cyclomatic complexity threshold, the fourth code metric value exceeding a maximum nesting threshold, and for the fifth code metric value exceeding a statement count threshold.

8. The method of claim 1, further comprising computing the code length for each candidate source code segment as an effective code length by subtracting any code lines for anonymous or local classes in the candidate source code segment from the total code lines for the candidate source code segment.

9. The method of claim 1, further comprising prioritizing each identified overlong source code segment by calculating a corresponding priority value as a product of at least a first scaling factor and a first quantity identifying how many statement lines are in the overlong source code segment code.

10. A computer program product comprising at least one computer readable storage medium having stored thereon an executable set of instructions and data which, when executed by at least one processing device, cause the at least one processing device to:
    receive a plurality of input source code segments from the software program submitted by a developer;
    evaluate each of the plurality of input source code segments for a plurality of predetermined code metric values;
    identify one or more candidate source code segments from the plurality of input source code segments by removing one or more code segments that meet a first code metric value;
    assess each of the one or more candidate source code segments against a second code metric value to identify a first set of candidate source code segments that contain the second code metric value and a second set of candidate code segments that do not contain the second predetermined code metric value;
    assess the first set of candidate source code segments against a first tailored set of code length thresholds to identify any overlong source code segment in the first set of candidate source code segments having a code length which meets or exceeds at least two of the first tailored set of code length thresholds; and assess the second set of candidate source code segments against a second tailored set of code length thresholds which is different from the first tailored set of code length thresholds to identify any overlong source code segment in the second set of candidate source code segments having a code length , which meets or exceeds at least two ofthe second tailored set of code length thresholds.

11. The computer program product of claim 10, wherein the set of instructions, when executed on the system, further causes the at least one processing device to report a prioritized list of any overlong source code segments that meets or exceeds at least two of the first tailored set of code length thresholds or at least two of the second tailored set of code length thresholds for recommended refactoring treatment by the developer.

12. The computer program product of claim 10, wherein the set of instructions, when executed on the system, further causes the at least one processing device to evaluate each of the plurality of input source code segments for the plurality ofpredetermined code metric values by evaluating each input source code segment for the first code metric value which indicates whether said input source code segment is autogenerated, for the second code metric value which indicates whether said input source code segment is a test code segment, for a third code metric value indicating a cyclomatic complexity of the input source code segment, for a fourth code metric value indicating a maximum nesting value of said input source code segment, and for a fifth code metric value indicating a statement count value for said input source code segment.

13. The computer program product of claim 12, wherein the set of instructions, when executed on the system, further causes the at least one processing device to identify one or more candidate source code segments by removing any autogenerated input source code segment that meets the first code metric value.

14. The computer program product of claim 12, wherein the set of instructions, when executed on the system, further causes the at least one processing device to assess each ofthe one or more candidate source code segments by identifying a first set of test methods that contain the second code metric value and a second set normal methods that do not contain the second predetermined code metric value.

15. The computer program product of claim 14, wherein the set of instructions, when executed on the system, further causes the at least one processing device to assess the first set of candidate source code segments by comparing a code length for each test method in the first set oftest methods against a first lower code length threshold and first upper code length threshold to identify a first overlong test method having a code length (1) which meets or exceeds the first lower code length threshold and the first upper code length threshold or (2) which meets or exceeds the first lower code length threshold and which also has at least one of the third code metric value exceeding a cyclomatic complexity threshold, the fourth code metric value exceeding a maximum nesting threshold, and for the fifth code metric value exceeding a statement count threshold.

16. The computer program product of claim 15, wherein the set of instructions, when executed on the system, further causes the at least one processing device to assess the second set of candidate source code segments by comparing a code length for each normal method in the second set ofnormal methods against a second lower code length threshold and second upper code length threshold to identity a second overlong normal method having a code length (1) which meets or exceeds the second lower code length threshold and the second upper code length threshold or (2) which meets or exceeds the second lower code length threshold and , which also has at least one of the third code metric value exceeding a cyclomatic complexity threshold, the fourth code metric value exceeding a maximum nesting threshold, and for the fifth code metric value exceeding a statement count threshold.

17. The computer program product of claim 10, wherein the set of instructions, when executed on the system, further causes the at least one processing device to compute the code length for each candidate source code segment as an effective code length by subtracting any code lines for anonymous or local classes in the candidate source code segment from the total code lines for the candidate source code segment.

18. The computer program product of claim 10, wherein the set of instructions, when executed on the system, further causes the at least one processing device to prioritize each identified overlong source code segment by calculating a corresponding priority value as a product of at least a first scaling factor and a first quantity identifying how many statement lines are in the overlong source code segment code.

19. A system comprising:
one or more processors;
a memory coupled to at least one of the processors; and
a set ofinstructions stored in the memory and executed by at least one of the processors to enhance operable functionality of a software program by identifying overlong source code segments, wherein the set ofinstructions are executable to perform actions of:
receiving a plurality of input source code segments from the software program submitted by a developer:
evaluating each of the plurality of input source code segments for a plurality of predetermined code metric values;
identifying one or more candidate source code segments from the plurality of input source code segments by removing one or more code segments that meet a first code metric value:
assessing each of the one or more candidate source code segments against a second code metric value to identify a first set of candidate source code segments that contain the second code metric value and a second set of candidate code segments that do not contain the second predetermined code metric value;
assessing the first set of candidate source code segments against a first tailored set of code length thresholds to identify any overlong source code segment in the first set of candidate source code segments having a code length which meets or exceeds at least two ofthe first tailored set of code length thresholds;
assessing the second set of candidate source code segments against a second tailoredset of code length thresholds which is different from the first tailored set of code length thresholds to identify any overlong source code segment in the second set of candidate source code segments having a code length which meets or exceeds at least two ofthe second tailored set of code length thresholds; and
reporting a prioritized list of any overlong source code segments that meets or exceeds at least two ofthe first tailored set of code length thresholds or at least two ofthe second tailored set of code length thresholds for recommended refactoring treatment by the developer.

20. The system of claim 19, where evaluating each of the plurality of input source code segments for the plurality of predetermined code metric values comprises evaluating each input source code segment for the first code metric value which indicates whether said input source code segment is autogenerated, for the second code metric value which indicates whether said input source code segment is a test code segment, for a third code metric value indicating a cyclomatic complexity of the input source code segment, for a fourth code metric value indicating a maximum nesting value of said input source code segment and for a fifth code metric value indicating a statement count value for said input source code segment.

21. The system of claim 20, where identifying one or more candidate source code segments comprises removing any autogenerated input source code segment that meets the first code metric value.

22. The system of claim 20, where assessing each of the one or more candidate source code segments comprises identifying a first set of test methods that contain the second code metric value and a second set normal methods that do not contain the second predetermined code metric value.

23. The system of claim 22, where assessing the first set of candidate source code segments comprises comparing a code length for each test method in the first set of test methods against a first lower code length threshold and first upper code length threshold to identify a first overlong test method having a code length (1) which meets or exceeds the first lower code length threshold and the first upper code length threshold or (2) which meets or exceeds the first lower code length threshold and which also has at least one of the third code metric value exceeding a cyclomatic complexity threshold, the fourth code metric value exceeding a maximum nesting threshold, and for the fifth code metric value exceeding a statement count threshold.

24. The system of claim 23, where assessing the second set of candidate source code segments comprises comparing a code length for each normal method in the second set of normal methods against a second lower code length threshold and second upper code length threshold to identify a second overlong normal method having a code length (1) which meets or exceeds the second lower code length threshold and the second upper code length threshold or (2) which meets or exceeds the second lower code length threshold and which also has at least one of the third code metric value exceeding a cyclomatic complexity threshold, the fourth code metric value exceeding a maximum nesting threshold, and for the fifth code metric value exceeding a statement count threshold.

25. The system of claim 20, where the set of instructions are executable to perform actions of prioritizing each identified overlong source code segment by calculating a corresponding priority value as a product of at least a first scaling factor and a first quantity identifying how many statement lines are in the overlong source code segment code.

\* \* \* \* \*